Patented Oct. 18, 1949

2,485,309

UNITED STATES PATENT OFFICE 2,485,309

CORROSION PREVENTION

Leslie G. Nunn, Jr., Tulsa, Okla., assignor to Standard Oil Development Company, a corporation of Delaware No Drawing. Application April 5, 1947, Serial No. 739,660

9 Claims. (Cl. 252—392)

The present invention is directed to a method for preventing corrosion in situations where a ferrous metal is in contact with aqueous fluids containing hydrogen sulphide.

In the production of oil, salt water is commonly produced concurrently with the oil. In many instances this salt water carries substantial percentages of hydrogen sulphide which may have its origin in the water or in the oil but which in any event occurs in the mixture. The production of such fluids, particularly in pumping wells, has given rise to very serious corrosion troubles which represent a very high monetary loss.

The principal object of the present invention is to provide a method for combating corrosion in lines containing ferrous metal and carrying aqueous fluids contaminated with hydrogen sulphide.

A more specific object of the present invention is the provision of cheap, easily-handled inhibitors for the treatment of such lines.

Still more specifically it is an object of the present invention to inhibit corrosion in ferrous lines carrying aqueous fluids contaminated with hydrogen sulphide by mixing with such fluids a methylol melamine condensation product.

The condensation products employed according to the present invention may be any methylol melamine condensation product or any modification thereof which is soluble in water or forms colloidal suspensions in water. The condensation product may be employed in its monomeric form or in a polymeric form, it being known that these condensation products have a tendency to polymerize under the influence of various factors. In general the type of compound employed according to the present invention may be indicated by the following type formula:

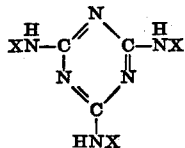

in which at least one X is a methylol group and in which the other X's may be one of the group consisting of hydrogen, CH₂OR, in which R is hydrogen or an alkyl group, and methylene. In the case where X is a methylene group other molecules may be attached to that shown, either of the same type or of a modified type. A usual addendum when X is a methylene group is a urea molecule or a molecule of a urea formaldehyde resin. Condensation products of this general melamine type are available on the market in the form of syrupy aqueous solutions and in the form of powders which are either soluble or colloidally dispersible in water.

In the practice of the present invention as it is applied to pumping wells, the inhibitor is poured at the surface into the annular space between the well casing and the producing string. In the ordinary case in which corrosion is encountered a pump will be mounted in the producing string. The action of the pump causes a surging motion of the reservoir fluid between the producing string and the casing whereby the inhibitor becomes thoroughly mixed in the reservoir fluid as it is pumped into the producing string. It will generally be sufficient to add 1 lb. of the inhibitor for each 100 bbls. of aqueous fluid produced. If desired instead of adding the melamine condensation product, as such, formaldehyde and melamine may be mixed at the surface and added to the well fluid. In this case between 1½ to 2 parts by weight of melamine is mixed with 1 part by weight of formaldehyde and the mixture is dumped in the annular space in an amount corresponding to about 1 lb. of mixture for 100 bbls. of aqueous fluid produced. It is, of course, possible to use any amount of the inhibitor in excess of the amount specified, and in certain cases where the hydrogen sulphide content of the aqueous fluid is especially high, larger amounts may be required. The proportion given is for the ordinary case.

When the condensation product employed is a solid, it is customary to make a slurry of it in the well fluid at the surface and dump the slurry into the annular space heretofore mentioned. It is again emphasized that in the preferred embodiment of the present invention the solid inhibitor is employed.

When the invention is practiced in surface lines carrying corrosive fluids of the character specified, the inhibitor is introduced into the line by any chemical proportioning device commonly used in such situations. In this case the content of the pipe line fluid represented by corrosive aqueous fluid is usually very small. Consequently the amount of inhibitor required is also very small. As a typical example a pipe line transporting about 30,000 bbls. of fluid per day, composed mainly of crude oil, may be properly protected by injecting into the pipe line about 5 lbs. of inhibitor every 24 hours. Let it be understood that this inhibitor will be added gradually so as to be added uniformly over a 24 hour period.

The present invention is also applicable to the protection of tanks or other vessels in which corrosive aqueous fluids of the character specified collect. In these cases the inhibitor is added to the bottom of the vessel containing the settled aqueous fluid in an amount substantially the same as that prescribed for pumping wells.

To illustrate the degree of protection afforded by the inhibitors employed according to the present invention, reference is made to tests in which test pieces in the form of sand blasted steel plates were immersed in salt water containing about 400 pts. per million of hydrogen sulphide for a period of 7 days. In one vessel the salt water contained no inhibitor and in the other vessels the salt water contained different inhibitors. The test piece was weighed at the beginning and at the end of 7 days and the loss of weight during this period was taken as a measure of the corrosive action of the liquid.

In the blank sample the test piece weighed 16.2343 grams at the beginning and after 7 days it weighed 16.2254 grams, representing a loss of 8.9 milligrams. In a comparable test the aqueous liquid contained an amount of methylol melamine resin corresponding to 1 lb. per 100 bbls. of aqueous liquid. The test piece weighed 16.7730 grams at the beginning and at the end of 7 days it weighed 16.7752 grams. This represented a gain in weight of 2.2 milligrams which is accounted for at least in part as a film formed on the test piece by the inhibitor.

In a check run utilizing the same amount of the same inhibitor the test piece initially weighed 15.9023 grams and at the end of 7 days it weighed 15.9040 grams, representing a gain in weight of 1.7 milligrams.

The nature and objects of the present invention having been thus described and illustrated, what is claimed as useful and is desired to be secured by Letters Patent is:

1. A method for inhibiting corrosion of ferrous metal in contact with an aqueous fluid containing hydrogen sulphide which comprises incorporating in the aqueous fluid a methylol melamine condensation product which is at least capable of being colloidally suspended in said aqueous fluid, said condensation product being used in a small but sufficient quantity to inhibit said corrosion.

2. A method according to claim 1 in which the condensation product is represented by the formula:

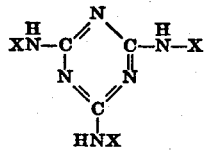

in which X is selected from the class consisting of hydrogen and methylene, methylol and CH₂OR groups, R being alkyl, at least one X being a methylol group.

3. A method according to claim 1 in which the methylol melamine condensation product is formed in situ in the aqueous fluid by adding thereto melamine and formaldehyde in the proportions of 1.5 to 2 parts of melamine to 1 part of formaldehyde by weight.

4. A method according to claim 1 in which the methylol melamine condensation product is a solid condensation product.

5. A method according to claim 1 in which the methylol melamine condensation product is a monomeric condensation product.

6. A method according to claim 1 in which the methylol melamine condensation product is a polymeric condensation product.

7. A method according to claim 2 in which one of the X's is a methylene group and has attached thereto a urea molecule.

8. A method according to claim 2 in which one of the X's is a methylene group and has attached thereto a molecule of a urea formaldehyde condensation product.

9. A method according to claim 1 in which the condensation product is added in the amount of about one pound per 100 barrels of aqueous fluid.

LESLIE G. NUNN, JR.

REFERENCES CITED

The following references are of record in the file of this patent:

UNITED STATES PATENTS

| Number    | Name    | Date          |
|-----------|---------|---------------|
| 2,080,422 | Hoover  | May 18, 1937  |
| 2,384,467 | Hill    | Sept. 11, 1945|
| 2,426,318 | Menaul  | Aug. 26, 1947 |